UNITED STATES PATENT OFFICE.

JOSEPH J. BARTLETT, OF NEW YORK, N. Y.

IMPROVEMENT IN ARTIFICIAL STONE.

Specification forming part of Letters Patent No. 140,239, dated June 24, 1873; application filed April 9, 1873.

*To all whom it may concern:*

Be it known that I, JOSEPH J. BARTLETT, of the city, county, and State of New York, have invented a new and Improved Compound for Artificial Stone; and I do hereby declare the following to be a full, clear, and exact description thereof, which will enable those skilled in the art to make and use the same.

This invention consists in a compound made of asbestus and of silicate of soda or potash, and exposed to the action of muriatic acid in such a manner, that, by mixing the asbestus and alkaline silicate together, a plastic mass is obtained, which can be brought in the required form or shape, and which, when exposed to the action of muriatic acid, becomes waterproof.

In carrying out my invention I take asbestus and grind it, or disintegrate the same by any suitable means, and then I mix it with a solution of soda or potash, in such proportion that a plastic mass is obtained of the consistency of mortar. This plastic mass I bring into the required form or shape either by molding or by rolling, or by any other means suitable for the purpose, and the articles thus prepared I immerse in a bath of muriatic acid diluted with water to such a degree as may be desirable for the article to be treated. By the action of the muriatic acid the silicate of soda or potash is decomposed and the mass becomes water-proof, either on its surface only or throughout its body, according to the length of time the muriatic acid is permitted to act, and according to the strength of the muriatic-acid bath.

Articles prepared from this compound are hard and tough. By the fibrous nature of the asbestus they retain a certain degree of elasticity, and after having been treated with the muriatic acid the surface of such articles can be polished or painted. By mixing the plastic mass, previous to molding or rolling the same, with suitable pigments, articles of any desired color can be produced.

My compound can be used with advantage for the purpose of lining book-cases, safes, or vaults, and for the manufacture of boxes for jewelry, or for valuable documents; also, for tiles for floors, ornamental or plain, and for roofing or general building purposes; also, for the exterior or covering for walls and ceilings, for moldings of cornices, architraves, center pieces, and other decorations, and, in fact, for all purposes where a fire and water proof material is desirable.

I do not claim in the manufacture of artificial stone the treatment of silicates with a chlorine salt; but

What I claim as new, and desire to secure by Letters Patent, is—

A compound obtained by mixing asbestus with alkaline silicates, and then treating the mixture with muriatic acid, substantially in the manner herein set forth.

JOS. J. BARTLETT.

Witnesses:
W. HAUFF,
E. F. KASTENHUBER.